United States Patent [19]
Sack et al.

[11] Patent Number: 5,795,009
[45] Date of Patent: Aug. 18, 1998

[54] REMOVABLE SHADE FOR MOTORCYCLE

[76] Inventors: James W. Sack, 1734 Dahlia St., Denver, Colo. 80220; James H. Shortén, 5809 E. Calle del Ciervo, Tucson, Ariz. 85750

[21] Appl. No.: 807,377

[22] Filed: Feb. 27, 1997

[51] Int. Cl.$^6$ .................................................. B62J 17/00
[52] U.S. Cl. ........................... 296/78.1; 296/136; 150/167
[58] Field of Search .......................... 296/78.1, 136; 150/166, 167

[56] References Cited

U.S. PATENT DOCUMENTS

| | | | |
|---|---|---|---|
| 1,534,067 | 4/1925 | Owen . | |
| 1,853,742 | 4/1932 | Owen et al. . | |
| 3,537,746 | 11/1970 | Peters | 296/78.1 |
| 4,171,145 | 10/1979 | Pearson, Sr. | 296/78.1 |
| 4,184,501 | 1/1980 | Johnson | 135/1 A |
| 4,283,084 | 8/1981 | Gallagher | 296/78.1 |
| 4,560,196 | 12/1985 | Carter, Sr. | 296/102 |
| 5,052,738 | 10/1991 | Li | 296/78.1 |
| 5,562,139 | 10/1996 | Cseri | 296/78.1 X |
| 5,676,288 | 10/1997 | Spirk | 150/167 X |

FOREIGN PATENT DOCUMENTS

| | | | |
|---|---|---|---|
| 179997 | 3/1954 | Germany | 296/78.1 |
| 614884 | 6/1961 | Italy | 296/78.1 |

*Primary Examiner*—Joseph D. Pape
*Attorney, Agent, or Firm*—John E. Reilly

[57] ABSTRACT

A removable sun shade for motorcycles includes a fabric sheet for generally taut extension over the upper part of the motorcycle, thereby forming an air-circulating region between the motorcycle and the sheet, the sheet including a plurality of attachment members disposed at spaced intervals around its periphery for placement about selected parts of the motorcycle to maintain the sheet in place over the motorcycle. A storage pouch is affixed to the sheet and is adapted for detachable connection to the motorcycle.

16 Claims, 2 Drawing Sheets

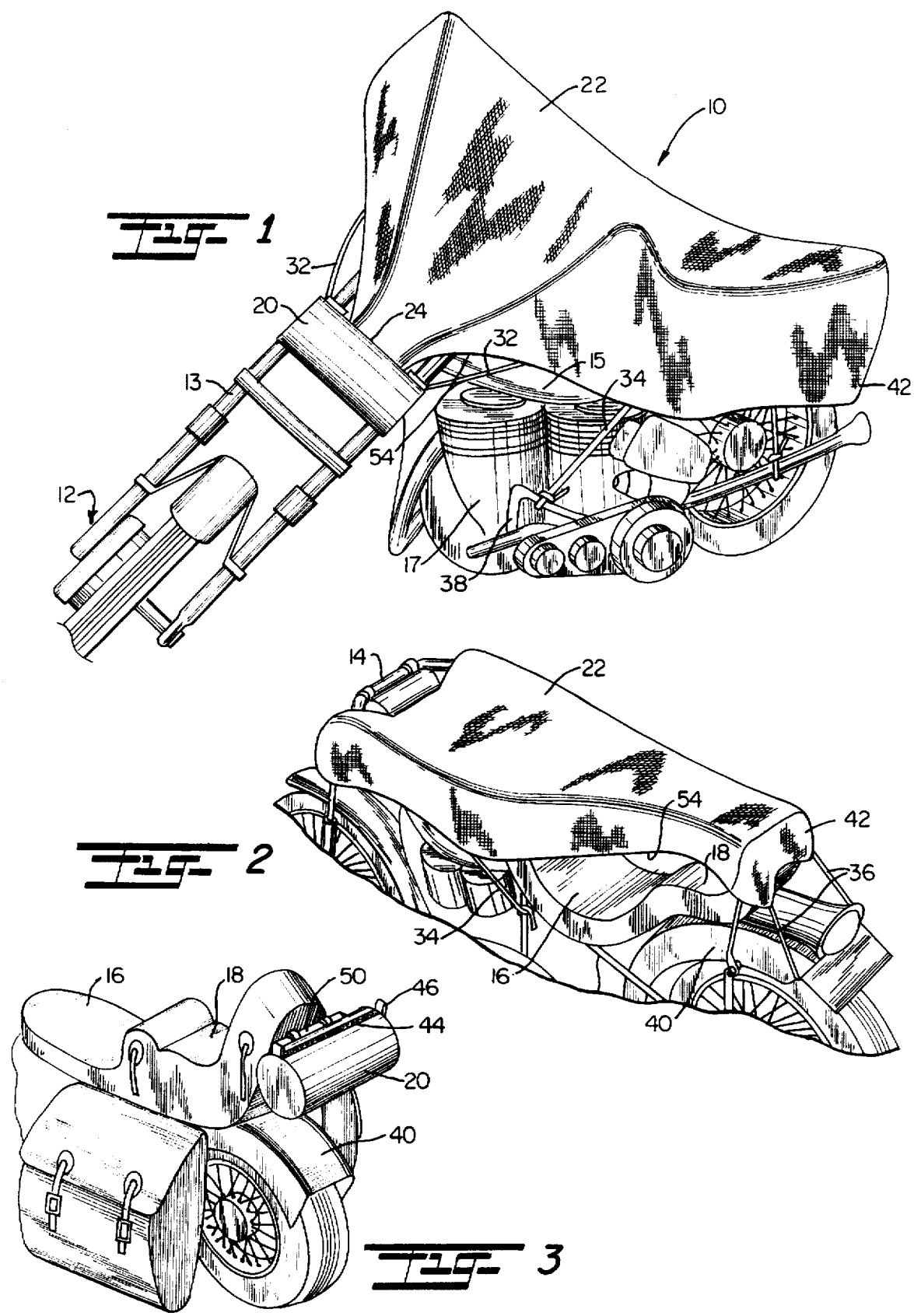

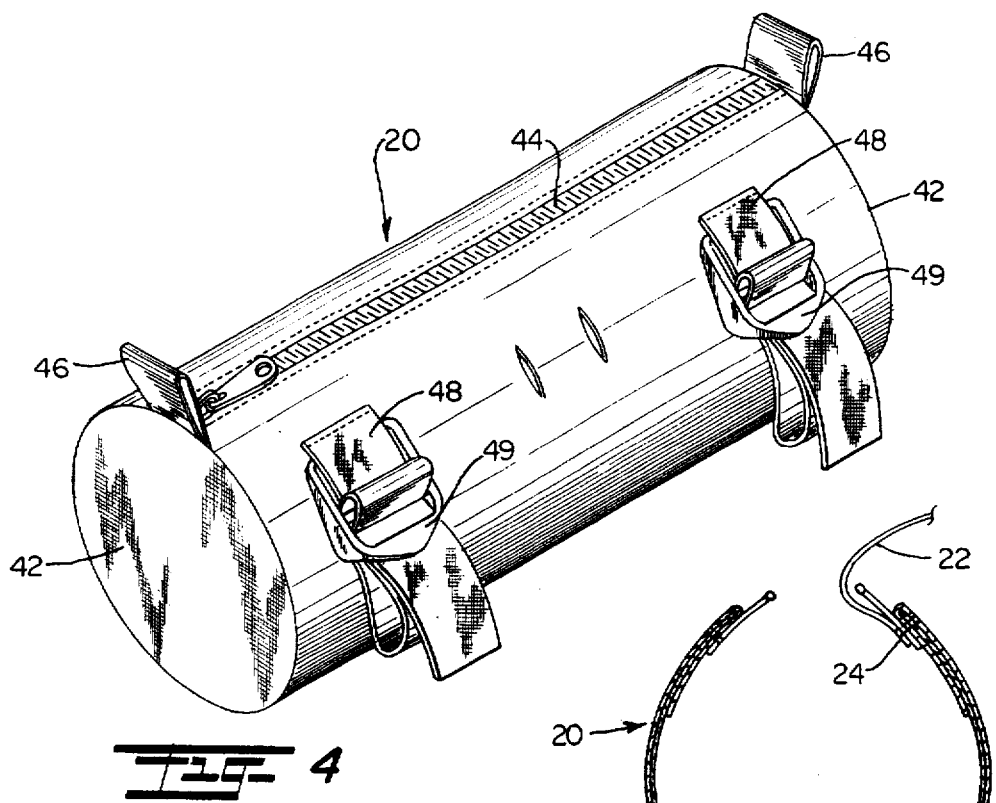
FIG. 4
FIG. 5
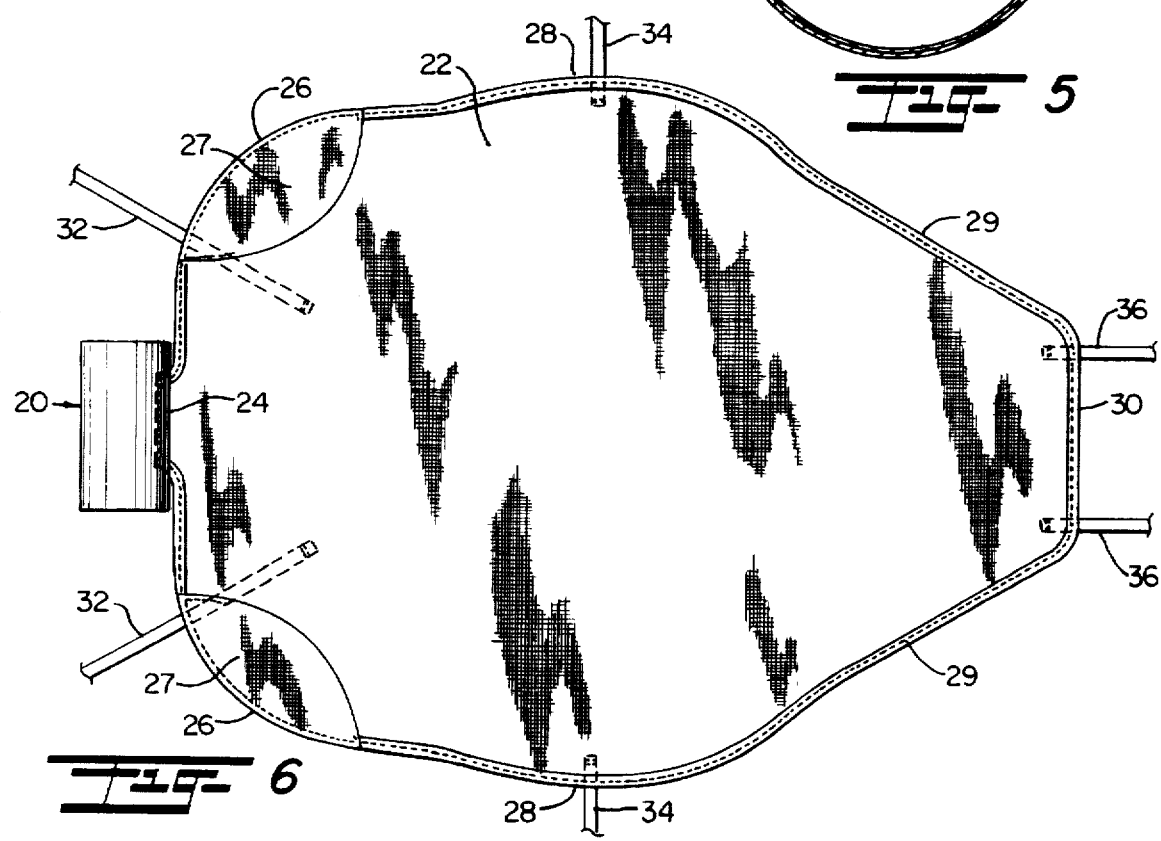
FIG. 6

REMOVABLE SHADE FOR MOTORCYCLE

BACKGROUND AND FIELD OF INVENTION

This invention relates generally to protective covers for vehicles, and more particularly relates to a novel and improved removable fabric sun shade for extension along the length of a motorcycle which has loops or strings for attachment around the motorcycle's pedals and frame, and which includes an attached storage pouch for placement around the front or back end of the motorcycle.

Vehicle owners often desire to protect their automobiles and motorcycles from the damage that can be caused by exposure to rain, sun, and other elements by using protective covers extended over the length of the vehicle. A variety of covers have been devised to afford such protection to automobiles and motorcycles. For instance, Owen et al. in U.S. Pat. No. 1,853,742 discloses a waterproof rain guard for use with a motorcycle which can be wound onto and unwound from a roller system on the back of the motorcycle. The cover includes an opening for the head of the rider to allow the rain guard to be used while driving. Gallagher's U.S. Pat. No. 4,283,084 discloses a pentagonal weatherproof cover which extends from the back of motorcycle to the front of the tank, also covering both sides of the engine. Pearson, Sr. in U.S. Pat. No. 4,171,145 describes a similar type of retractable seat cover for motorcycles made of a heavy waterproof material. Gallagher, in U.S. Pat. No. 4,283,084 discloses a lightweight motorcycle cover which can be folded in a compact handsize package when not in use. Owen's U.S. Pat. No. 1,534,067 shows a flexible-shield or apron-like cover which extends upwardly in front of the rider to afford protection for the upper part of the body or trunk. U.S. Pat. Nos. 4,560,196 and 4,184,501 to Carter, Sr. and Johnson, respectively, are of general interest in showing the state of the art.

Often, the types of motorcycle and automobile covers disclosed in the prior art are made of a heavy, water resistant material which is difficult to fold or otherwise store when not in use. Further, these heavier materials might be effective to keep moisture off the vehicle, but may not be as effective at keeping the vehicle cool when it is parked in the hot sun. Therefore, a need exists for a cover intended specifically for use as a lightweight sunshade having a shape and size that can accommodate a variety of motorcycle sizes and which can be conveniently stored and attached to the cycle. The present invention meets this need by providing a motorcycle shade made of a cloth or fabric that will allow air to circulate between the shade and motorcycle seat and which can be easily folded and stored when not in use into an attached pouch or bag secured to the motorcycle.

SUMMARY OF THE INVENTION

It is therefore an object of the present invention to provide a novel and improved protective cover for a motorcycle that will effectively shade the motorcycle from the effects of the sun.

It is a further object of the present invention to provide a motorcycle sun shade that will allow air to circulate between the shade and the motorcycle to more effectively keep the motorcycle cooler.

Yet another object of the present invention is to provide a motorcycle sun shade with an attached pouch that can be releasably secured to the front or rear of the motorcycle for forward or rearward extension of the shade over the motorcycle and for convenient storage and transport of the shade when not in use.

A still further object of the present invention is to provide a motorcycle sun shade that includes means for secure attachment to the motorcycle to prevent the sun shade from sliding off or being removed by the wind.

In accordance with the present invention, a removable sun shade for motorcycles broadly comprises a fabric sheet for extension over the upper part of the motorcycle thereby forming an air-circulating region between the motorcycle and the sheet, the sheet including a plurality of attachment members disposed at spaced intervals around its periphery for placement about selected parts of the motorcycle to maintain the sheet in place over the motorcycle. A storage pouch is affixed to the sheet and includes means for detachable connection to the motorcycle.

The above and other objects of the present invention will become more readily appreciated and understood from a consideration of the following detailed description the preferred form of the present invention when taken together with the accompanying drawings in which:

BRIEF DESCRIPTION OF THE DRAWINGS

FIG. 1 is a perspective view of a preferred form of motorcycle shade over the upper portion of a motorcycle and a storage pouch therefor;

FIG. 2 is a side perspective view of the preferred form of motorcycle shade shown in FIG. 1 with attachment members placed around the rear fender and sides of the motorcycle;

FIG. 3 is another perspective view of a modified form of motorcycle shade with the sheet portion stowed in a storage pouch attached behind the rear seat of the motorcycle;

FIG. 4 is another perspective view in more detail of the storage pouch of FIGS. 1 and 3 with the sheet contained therein;

FIG. 5 is a cross-sectional view of the storage pouch shown in FIGS. 3 and 4 with an attached end of the sheet extending therefrom; and FIG. 6 is a top plan view of the preferred form of sheet member in a flattened position with attachment members extending therefrom.

DETAILED DESCRIPTION OF PREFERRED EMBODIMENT

Referring now to the accompanying drawings, wherein like reference numerals designate corresponding structure throughout the views, and referring in particular to FIGS. 1 and 2, the preferred form of motorcycle sun shade of the present invention 10 is intended to be extended over the length of a motorcycle 12 to substantially cover the upper portion of the motorcycle 12, including the front fork 13, handlebars 14, tank 15, front and rear seat portions 16, 18, and engine 17 of the motorcycle, shading those portions from sunlight.

Referring to FIGS. 1, 2 and 6, the shade 10 comprises a storage pouch 20 and a generally oblong or generally diamond-shaped, flexible sheet member 22 extending rearwardly from the pouch 20 over the motorcycle 12, the storage pouch 20 being mounted at the upper end of the front fork 13 adjacent to the center portion of the handlebars 14. The sheet 22 is preferably formed with a reinforced peripheral edge having or defining a front squared end portion 24 attached to the interior of the pouch 20, the peripheral edges continuing laterally into front rounded corners 26 having handlebar pockets 27 for releasable insertion and retention of grip ends of the handlebars, the edges then diverging rearwardly into widened, curved portions 28 then tapering rearwardly to define relatively straight inclined edges 29 which terminate in a rear squared end portion 30. A plurality of attachment members in the form of straps are each secured at one end to the sheet 22 adjacent to the peripheral edges for outward and downward extension from the sheet 22 when the latter is placed over the motorcycle 12. Preferably, the straps include a pair of front, diagonally directed strap members 32 at the front end, side loops 34 extending from the widened portions 28 and a pair of rear spaced straps 36. The front straps 32 can be tied around the front fork 13, the side straps 34 tied around the foot pedals or cranks 38, and the rear straps 36 tied around or beneath the rear fender 40 to secure the shade over the handle bars 14, front and rear seat portions 16, 18 and a rear fender 40.

As evident from FIG. 1, the sheet 22 may be modified somewhat to include an elasticized, fitted or cup-shaped rear portion as designated at 42 for placement over the rear seat 18 without the use of the attachment members or straps 36 around the rear fender 40. Similarly, as best seen from FIG. 2, the pockets 27 at the front end of the sheet permit insertion of the grip ends of the handle bars 14.

FIGS. 1-3 illustrate different positions of attachment of the storage pouch 20 to the motorcycle 12. For example, in FIG. 1, the storage pouch 20 is mounted in front of the front fork 13 and the front edge portion 24 is attached to the interior of the pouch for rearward extension of the sheet 22 over the top of the motorcycle 12 as described. In FIG. 2, the pouch 20 is mounted behind the fork 13, and the sheet 22 extends rearwardly therefrom for attachment to the motorcycle 12. In FIG. 3, the storage pouch 20 is mounted directly behind the rear seat portion 18 of the motorcycle 12. In this mounting, the attachment of the sheet 22 is reversed so that the rear end portion 30 is attached to the interior of the pouch 20 and the sheet 22 extended forwardly over the top of the motorcycle 12 and attached in the same manner as previously described.

FIGS. 4 and 5 illustrate in more detail the construction and arrangement of the storage pouch 20 wherein the pouch 20 is of generally cylindrical configuration having opposite ends 42 of circular configuration and a zippered closure portion 44 extending the length of the pouch 20 with looped holder portions 46 at opposite ends of the closure to facilitate grasping and opening and closing of the zipper portion 44. A pair of connecting straps 48 are positioned in the longitudinally spaced relation to the exterior of the pouch 20 including buckles 49 so that the connecting strap 48 can be looped around either the handle bars 14 or rear bar 50 behind the rear seat 18 and adjustably tightened by means of the buckles 49. As shown in FIG. 5, the front edge portion 24 is stitched to the interior of the pouch 20 adjacent to one side of the zippered closure 44 so that the sheet 22 will remain attached to the pouch 20 either in the stored or extended position. The pouch 20 is preferably composed of a synthetic, water-resistant material that will keep the sheet 22 dry and unsoiled when the motorcycle 12 is driven or the sheet 22 is otherwise not in use.

The motorcycle shade 10 is primarily intended to shield the upper parts of the motorcycle 12 from the effects of sun and heat, and accordingly the sheet 22 is preferably composed of a weather resistant cloth or fabric material that will have some breathability to permit air circulation therethrough. In this relation, when the sheet 22 is extended over the motorcycle 12 and the straps are attached as described, a space 54 will be formed between the sheet 22 and the upper portion of the motorcycle 12 to better permit air to circulate beneath the sheet 22.

It will be apparent from the foregoing that various modifications may be made in the specific construction and configuration of the sheet 22 as well as the attaching straps as described. For example, the sheet 22 may include an elastic material sown into the peripheral edge portions or a drawstring which will tend to draw or contract the edges of the sheet 22 more closely around the handlebars 14 and front and rear seat portions 16, 18 when a drawstring at one end of the sheet 22 is pulled, thereby minimizing the need for the attachment members or straps. Also, the straps may be of generally looped-shaped configuration so as not to necessitate the tying of each individual strap to a portion of the motorcycle 12 and this is particularly true of the front straps 32 and the rear straps 36.

It is therefore to be understood that while preferred and modified forms of invention have been herein set forth and described various modifications and changes may be made in the specific construction and arrangements and elements as well as composition of materials without departing from the spirit and scope of the present invention as defined by the appended claims and reasonable equivalents thereof:

I claim:

1. A removable protective shade for shielding a motorcycle from the sun, comprising:

a flexible sheet for generally taut extension over the handlebars and seat portion of a motorcycle having front rounded corners including means for releasably receiving grip ends of said handlebars;

attachment means disposed around the periphery of said sheet being connectable to selected parts of said motorcycle thereby retaining said sheet over said handlebars and seat portion; and a storage pouch affixed to a front end of said sheet for releasably storing said sheet therein and including means for detachable connection of said pouch to a frontal portion of said motorcycle.

2. A shade according to claim 1 wherein said sheet includes a front squared end portion and a rear squared end portion, said end portions connected by generally curved peripheral edges.

3. A shade according to claim 1 wherein said releasable receiving means are selected from the group consisting of fabric and elastic loops and strings.

4. A shade according to claim 1 wherein said releasable receiving means are placed about the foot pedals, frame and handlebars of said motorcycle.

5. A shade according to claim 1 wherein said sheet includes a reinforced peripheral edge defining a center region, releasable receiving means including a plurality of said attachment members each secured at one end to said peripheral edge.

6. A shade according to claim 5 wherein said attachment members are disposed at opposite ends and on opposite sides of said sheet, each of said members having an end affixed to a center region of said sheet.

7. A shade according to claim 1 wherein an air-circulating space is formed between said sheet and said motorcycle when said sheet is extended thereover.

8. A removable protective shade for shielding a motorcycle from the sun, comprising:

a flexible sheet of generally diamond-shaped configuration for generally taut extension over the handlebars and seat portion of said motorcycle, said sheet formed with peripheral edges defining a front end portion, said edges extending laterally from said front end portion into front rounded corners, said edges then diverging rearwardly from said corners into widened curved portions and tapering rearwardly from said curved portions to define straight inclined edges, said inclined edges terminating in a rear end portion; and a plurality of attachment members disposed at spaced intervals around said peripheral edges, said attachment members being connectable to selected parts of said motorcycle thereby retaining said sheet over said handlebars and seat portion.

9. A shade according to claim 8 wherein said front corners include pockets for insertion and retention of respective grip ends of said handlebars, and a storage pouch affixed to one of said end portions for releasably storing said sheet therein and including means for detachable connection of said pouch to said motorcycle.

10. A shade according to claim 9 wherein said pouch is mounted in front of a front fork of said motorcycle, said front edge portion attached to an interior surface of said pouch for rearward extension of said sheet over said handlebars and said seat portion.

11. A shade according to claim 9 wherein said pouch is mounted behind a front fork of said motorcycle, said front edge portion attached to an interior surface of said pouch for rearward extension of said sheet over said handlebars and said seat portion.

12. A shade according to claim 9 wherein said pouch is mounted behind a rear seat portion of said motorcycle, said rear end portion attached to an interior surface of said pouch for forward extension of said sheet over said motorcycle.

13. A shade according to claim 8 wherein said attachment members include a first pair of strap members disposed proximate to said front end portion and directed diagonally therefrom, a second pair of strap members, each of said second pair extending from one of said widened portions, and a third pair of strap members disposed proximate to said rear end portion.

14. A shade according to claim 13 wherein said first pair of strap members is connectable to a front fork of said motorcycle, said second pair of strap members are each connectable to a foot pedal, and said third pair of strap members is connectable to a rear fender of said motorcycle.

15. A shade according to claim 8 wherein said sheet includes an elasticized fitted rear portion for placement over a rear seat of said motorcycle.

16. A removable protective shade for shielding a motorcycle from the sun, comprising:

a flexible sheet composed of a cloth or fabric material for generally taut extension over the handlebars and seat portion of said motorcycle, said sheet formed with peripheral edges defining a front squared end portion, said edges extending laterally from said front end portion into front rounded corners having pockets for insertion of free ends of said handlebars, said edges then diverging rearwardly from said corners into widened curved portions and tapering rearwardly from said curved portions to define straight inclined edges, said inclined edges terminating in a rear squared end portion; and attachment means connectable to selected parts of said motorcycle thereby retaining said sheet over said handlebars and seat portion.

\* \* \* \* \*